(12) United States Patent
Lei

(10) Patent No.: US 7,186,477 B2
(45) Date of Patent: Mar. 6, 2007

(54) HEADER FOR RECHARGEABLE LITHIUM BATTERIES

(75) Inventor: Steven K. Lei, Burnaby (CA)

(73) Assignee: E-One Moli Energy (Canada) Limited (CA)

( * ) Notice: Subject to any disclaimer, the term of this patent is extended or adjusted under 35 U.S.C. 154(b) by 178 days.

(21) Appl. No.: 10/408,935

(22) Filed: Apr. 8, 2003

(65) Prior Publication Data
US 2003/0194601 A1 Oct. 16, 2003

(30) Foreign Application Priority Data
Apr. 10, 2002 (CA) ................................. 2381376

(51) Int. Cl.
*H01M 2/12* (2006.01)
(52) U.S. Cl. .......................... 429/56; 429/61
(58) Field of Classification Search ................. 429/53, 429/56, 61
See application file for complete search history.

(56) References Cited

U.S. PATENT DOCUMENTS

| 4,943,497 | A | * | 7/1990 | Oishi et al. ............. 429/53 |
| 5,418,082 | A | | 5/1995 | Taki et al. .............. 429/53 |
| 5,691,073 | A | * | 11/1997 | Vu et al. ............. 429/56 X |
| 6,207,319 | B1 | | 3/2001 | Nam ..................... 429/163 |
| 6,207,320 | B1 | | 3/2001 | Song et al. ............. 429/171 |
| 6,235,424 | B1 | | 5/2001 | Cho ..................... 429/175 |
| 6,242,126 | B1 | * | 6/2001 | Mori et al. .............. 429/53 |
| 6,255,016 | B1 | | 7/2001 | Kim ..................... 429/174 |
| 6,284,403 | B1 | | 9/2001 | Tsurutani et al. ......... 429/53 |
| 6,326,100 | B1 | | 12/2001 | Han et al. ............... 429/57 |
| 6,555,263 | B1 | * | 4/2003 | Kim et al. .............. 429/61 |

FOREIGN PATENT DOCUMENTS

CA 2099657 2/1994

* cited by examiner

Primary Examiner—Stephen J. Kalafut
(74) Attorney, Agent, or Firm—Synnestvedt Lechner & Woodbridge LLP

(57) ABSTRACT

A header for rechargeable lithium batteries, which incorporates a riveted disconnect mechanism. The header is especially useful for rechargeable lithium batteries for high power applications.

3 Claims, 5 Drawing Sheets

000
HEADER FOR RECHARGEABLE LITHIUM BATTERIES

FIELD OF THE INVENTION

This invention pertains to an improved header for non-aqueous lithium rechargeable batteries. The header incorporates a riveted disconnect mechanism. It is particularly useful for high power applications as the current distribution through the improved header is more efficient and the electrical impedance of the battery is significantly reduced when compared to a conventional header.

BACKGROUND OF THE INVENTION

The demand for rechargeable batteries having ever greater energy density has resulted in substantial research and development activity related to lithium rechargeable batteries. The use of lithium is associated with high energy density, high battery voltage and long shelf life.

Rechargeable lithium-ion batteries are the preferred rechargeable power source for many consumer electronics applications. These batteries have the greatest energy density (Wh/L) of presently available conventional rechargeable systems (ie. NiCd, NiMH, or lead acid batteries). Additionally, because of the higher operating voltage of lithium ion batteries fewer cells need to be connected in series than for these other rechargeable systems. Consequently lithium ion batteries are increasingly attractive for high power applications such as electric bicycles, portable power tools and hybrid electric vehicles. Lithium ion batteries use two different insertion compounds for the active cathode and anode materials. Lithium ion batteries based on the $LiCoO_2$/graphite system are now commercially available. Many other lithium transition metal oxide compounds are suitable for use as the cathode material, including $LiNiO_2$ and $LiMn_2O_4$. Also, a wide range of carbonaceous compounds is suitable for use as the anode material, including coke and non-graphetizing hard carbon. The aforementioned products employ non-aqueous electrolytes comprising $LiBF_4$ or $LiPF_6$ salts and solvent mixtures of ethylene carbonate, propylene carbonate, diethyl carbonate, ethyl methyl carbonate, and the like. Again, numerous options for the choice of salts and/or solvents in such batteries are known to exist in the art.

Lithium ion batteries can be sensitive to certain types of abuse, particularly overcharge abuse wherein the normal operating voltage is exceeded during recharge. During overcharge, excessive lithium is extracted from the cathode with a corresponding excessive insertion or even plating of lithium at the anode. This can make both electrodes less stable thermally. Overcharging also results in heating of the battery since much of the input energy is dissipated rather than stored. The decrease in thermal stability combined with battery heating can lead to thermal runaway and fire on overcharge. Many manufacturers have incorporated safety devices to provide protection against overcharge abuse. For instance, as described in U.S. Pat. No. 4,943,497 and Canadian Patent No. 2,099,657 respectively, the present products of Sony and E-One Moli Energy (Canada) Limited incorporate internal disconnect devices which activate when the internal pressure of the battery exceeds a predetermined value during overcharge abuse.

These pressure activated disconnect devices thus rely on battery constructions wherein the internal pressure is maintained below the predetermined value over a wide range of normal operating conditions yet, during overcharge, the internal pressure reliably exceeds said value.

In a conventional cylindrical lithium ion battery as depicted in FIG. 1, a jelly roll 4 is created by spirally winding a cathode foil 1, an anode foil 2, and two microporous polyolefin sheets 3 that act as separators.

The jelly roll 4 is inserted into a conventional battery can 10. A header 11 and gasket 12 are used to seal the battery 15. The header includes an internal electrical disconnect device similar to that shown in the aforementioned Canadian Patent No. 2,099,657 and additional safety devices if desired. Often, a safety vent is incorporated that ruptures if excessive pressure builds up in the battery. Also, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4.

FIG. 2a shows details of a similar header as depicted in FIG. 1. The assembly comprises the following sequence: a cap 20 with vent holes, two nickel rings 21, a rupture disc 22, a locating insulator 23, a weld plate 24 that snap fits into a polypropylene gasket 12. The rupture disc 22 is laser welded to the centre of the weld plate 24. The cathode tab is in turn laser welded to the bottom of the weld plate 24. Therefore, all the current must flow through the small contact area at the centre of the weld plate 24 making the battery hot during charging and discharging. This is undesirable for high power cells because the localized high current densities can generate heat, which is not easily dissipated from such a confined area. Moreover, it is difficult to decouple disconnect pressure from current carrying capability for conventional header design.

SUMMARY OF THE INVENTION

The present invention is an improved header for cylindrical lithium rechargeable batteries. It is particularly useful for high power applications as the heat generated during battery cycling is dissipated more efficiently. The header assembly comprises a cap with tear-tabs on the vent holes, a rupture disc, an insulator disc, and an annular plate that snap fits into the polypropylene gasket. Laser welding between the rupture disc and the weld plate is eliminated. Instead, the annular weld plate is riveted to the rupture disc. The cathode tab or multiple tabs are welded off centre to the annular weld plate.

The improvement lies in the increased current carrying capacity through the distributed contact between the annular weld plate and the rupture disc and a decrease in the electrical impedance of the battery. In addition, the number of parts for the header is reduced, thus making the assembly simple to manufacture in large quantities.

Moreover, the mechanism to activate the electrical disconnect is also improved. The conventional header disconnects by breaking the scored centre section of the rupture disc above a prescribed pressure as shown in FIG. 2b. The improved header disconnects when the rupture disc is deformed as shown in FIG. 3b. As the rupture disc 22 bulges towards the cap 20, it pulls out of the annular weld plate 24 and breaks the electrical connection. The pressure at which the header disconnects is controlled by the degree of crimp applied to the rupture disc 22. Therefore, the disconnect is not easily activated by shock or vibration. The annular weld plate 24 is firmly held in place unless the rupture disc 22 is deformed by internal pressure. In the conventional header the scored section of the weld plate is vulnerable to breaking due to shock or vibration.

Another advantage of the invention is the addition of tear-tabs 40 located at the vent holes of the cap as shown in FIG. 6. These are projections on the lower part of the vent holes designed to catch and tear open the rupture disc if it continues to bulge due to excessive internal pressure over and above that required to activate the disconnect, allowing gas to escape and thereby preventing explosion from occurring.

DETAILED DESCRIPTION OF SPECIFIC EMBODIMENTS OF THE INVENTION

The invention relates to an improved header design for rechargeable lithium batteries. The improvement lies in the increased current carrying capacity through the contact between the weld plate and the rupture disc and a decrease in the electrical impedance of the cell. In addition, the number of parts for the header is reduced, thus making the assembly simple for manufacturing in large quantities. The header design of the invention is particularly useful for high power applications.

Figure 1:
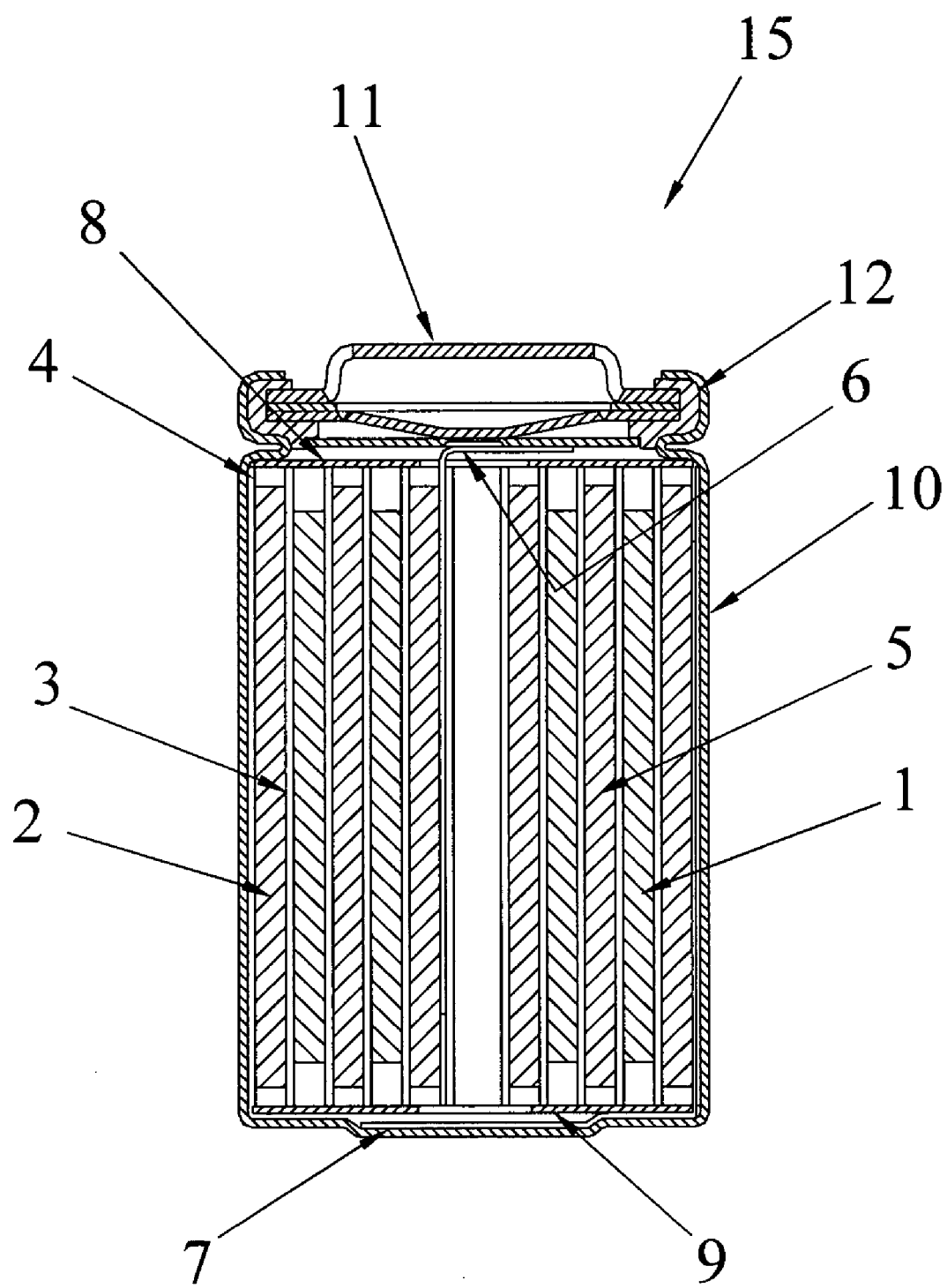
FIG. 1 depicts a cross-sectional view of an embodiment of a conventional cylindrical spiral-wound lithium battery.

A typical construction for a rechargeable lithium battery is depicted in the cross-sectional view of a conventional spiral-wound battery as shown in FIG. 1.

Cathode foils are prepared by applying a mixture of a suitable powdered (about 10 micron size typically) cathode material, such as a lithiated transition metal oxide, a binder, and a conductive diluent onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil. The jelly roll 4 is inserted into a conventional battery can 10. A header 11 and gasket 12 are used to seal the battery 15. The header includes an internal electrical disconnect device similar to that shown in the aforementioned Canadian Patent No. 2,099,657 and additional safety devices if desired. Often, a safety vent is incorporated that ruptures if excessive pressure builds up in the battery. Also, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4.

Other configurations of the jelly-roll are also possible, however, we are concerned with the design of the header. Therefore, all reference from this point forward will be strictly on the header design.

Figure 2A:
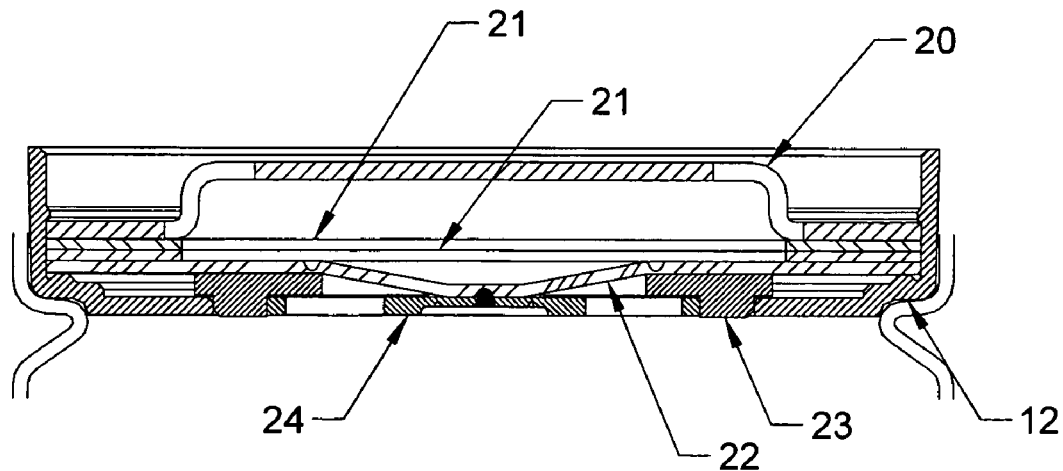
FIG. 2a depicts a cross-sectional view of a conventional header for a cylindrical lithium battery.
Figure 2B:
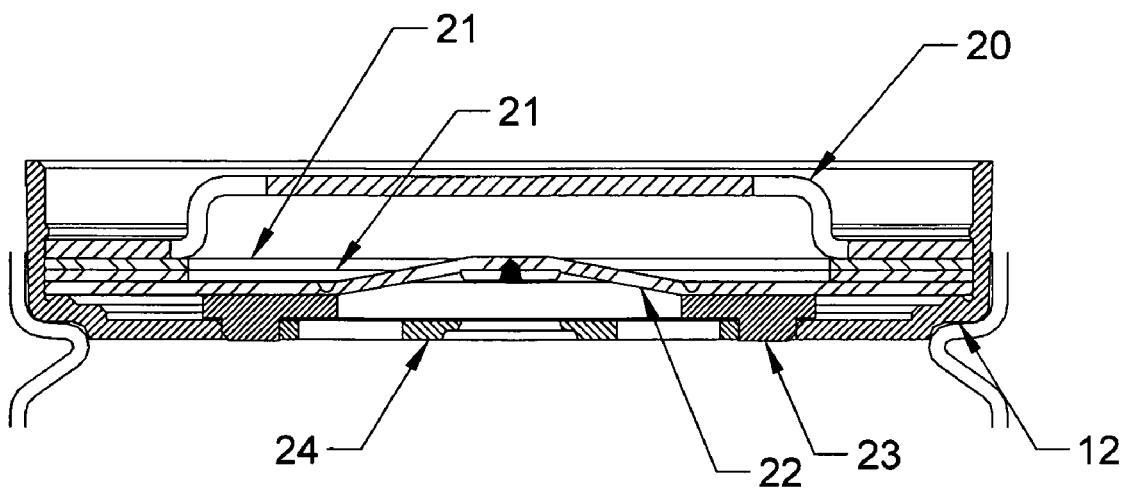
FIG. 2b depicts a cross-sectional view of a conventional header for cylindrical lithium battery after the battery is disconnected.

FIG. 2a shows details of a similar header as depicted in FIG. 1. The assembly comprises the following sequence: a cap 20 with vent holes, two nickel rings 21, a rupture disc 22, a locating insulator 23, a weld plate 24 that snap fits into a polypropylene gasket 12. The rupture disc 22 is laser welded to the centre of the weld plate 24. The cathode tab is in turn laser welded to the bottom of the weld plate 24. Therefore, all the current must flow through the small contact area at the centre of the weld plate 24 making the battery hot during charging and discharging. This is undesirable for high power cells because the localized high current densities can generate heat, which is not easily dissipated from such a confined area.

Figure 4:
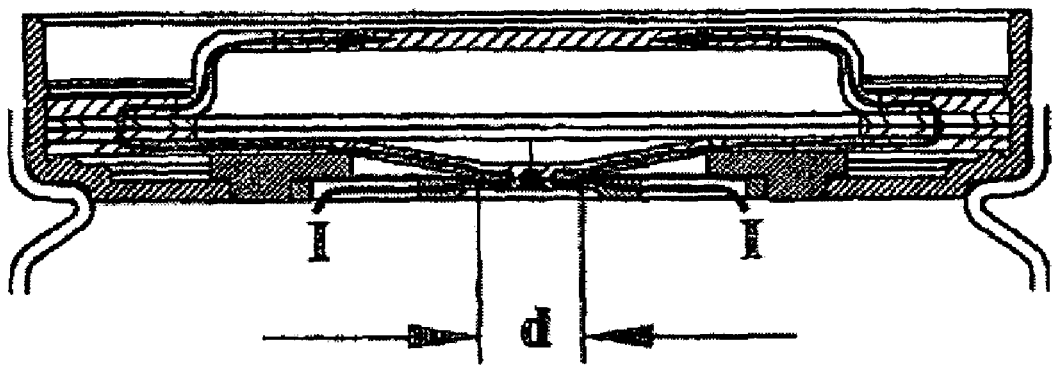
FIG. 4 depicts the current flow, I, on a cross-sectional view of a conventional header for a cylindrical lithium battery.

The conventional header structure constrains the electrical current to flow through a small area in the vicinity of the laser weld connecting the rupture disc to the weld plate. This can be graphically represented as a constriction of the lines of current flow (as indicated by the heavy line labeled I) through a tight loop of diameter d as indicated in FIG. 4. If D is the battery diameter, the ratio d/D is less than about 0.1 for conventional headers. This is undesirable for high power cells because the localized high current densities can generate heat which is not easily dissipated from such a confined area.

Figure 3A:
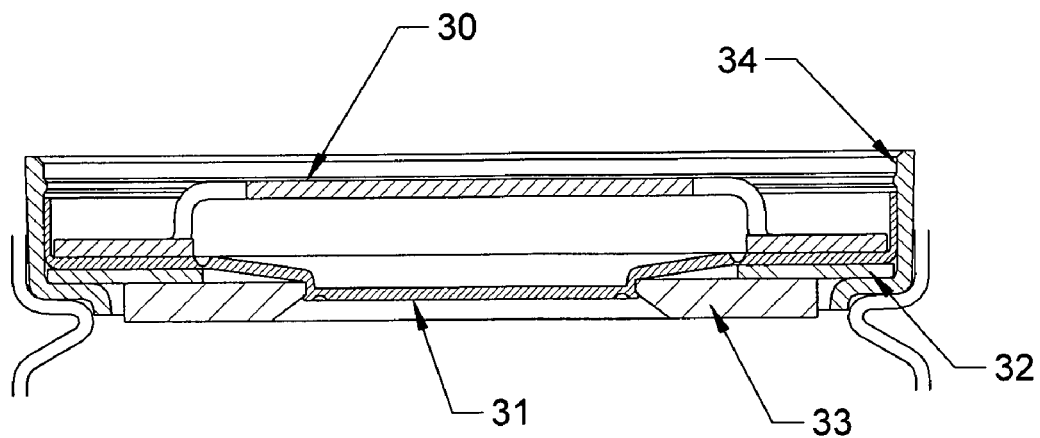
FIG. 3a depicts a cross-sectional view of the improved header for a cylindrical lithium battery.
Figure 3B:
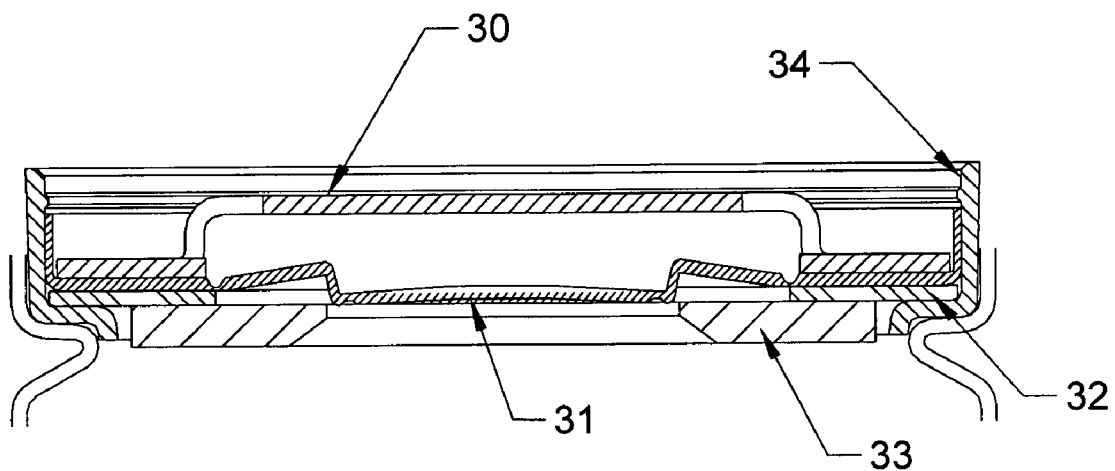
FIG. 3b depicts a cross-sectional view of the improved header for a cylindrical lithium battery after the battery is disconnected.

FIG. 3a shows a cross-sectional view of the improved header for a cylindrical lithium battery. The improved header assembly comprises the following sequence: a cap 30 with tear-tabs on the vent holes, a rupture disc 31, a non-melting insulator disc 32, an annular weld plate 33 that snap fits into a polypropylene gasket 34. The rupture disc 31 and the annular weld plate 33 are riveted together to make a low impedance contact. During riveting, the material of the rupture disc 31 is spread by the rivet punch supported by the ledge of the annular weld plate 33. This is depicted in FIGS. 3a and 3b as the dimples on the rupture disc 31. As a result the current path length is shortened and the current density is reduced, especially at the contact area between the annular weld plate 33 and the rupture disc 31. The contact area at the rivet is essentially the inside circumference of the annular weld plate 33 multiplied by the thickness of the weld plate 33 at that point, which is much larger than the cross sectional area of a laser weld spot as in the conventional headers. Consequently, the impedance is generally lower than for conventional headers.

FIG. 3b shows a disconnected header of the invention. The improved header design disconnects when the rupture disc 31 is deformed during abnormal charging situations, that is, when an internal pressure inside the battery builds up above the prescribed pressure of the rupture disc. As the rupture disc 31 bulges towards the cap 30, the rupture disc 31 is pulled out the annular weld plate 33 and breaks the electrical connection. The pressure at which the header disconnects is controlled by the degree of crimp applied to the rupture disc 31. In addition, the annular weld plate 33 is firmly held in place unless the rupture disc 31 is deformed by internal pressure, therefore, the disconnect is not easily activated by shock or vibration.

Figure 5:
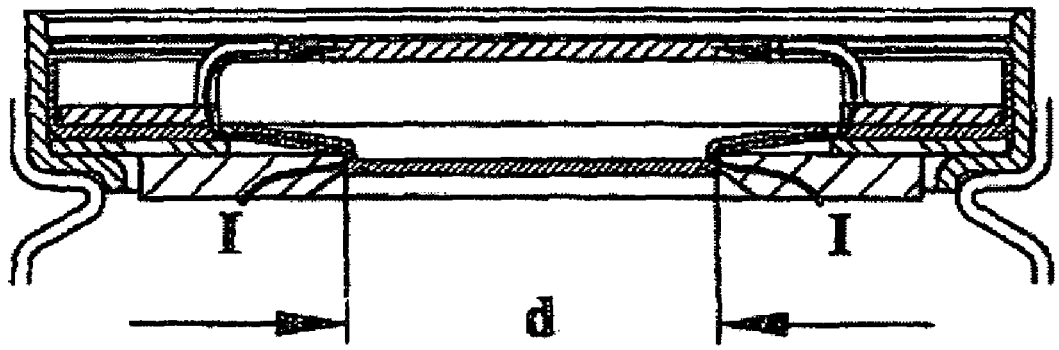
FIG. 5 depicts the current flow, I, on a cross-sectional view of the improved header for a cylindrical lithium battery.

The improved header structure has a distributed contact along the entire circumference of the annular weld plate so that the current flow is spread over a relatively large area. This is graphically represented in FIG. 5 by the narrowest constriction of the lines of current flow (as indicated by the heavy line labeled 'I') being through loop of diameter d such that d/D~0.4, D being the battery diameter. Perferably, d/D is 0.2 or greater.

Figure 6:
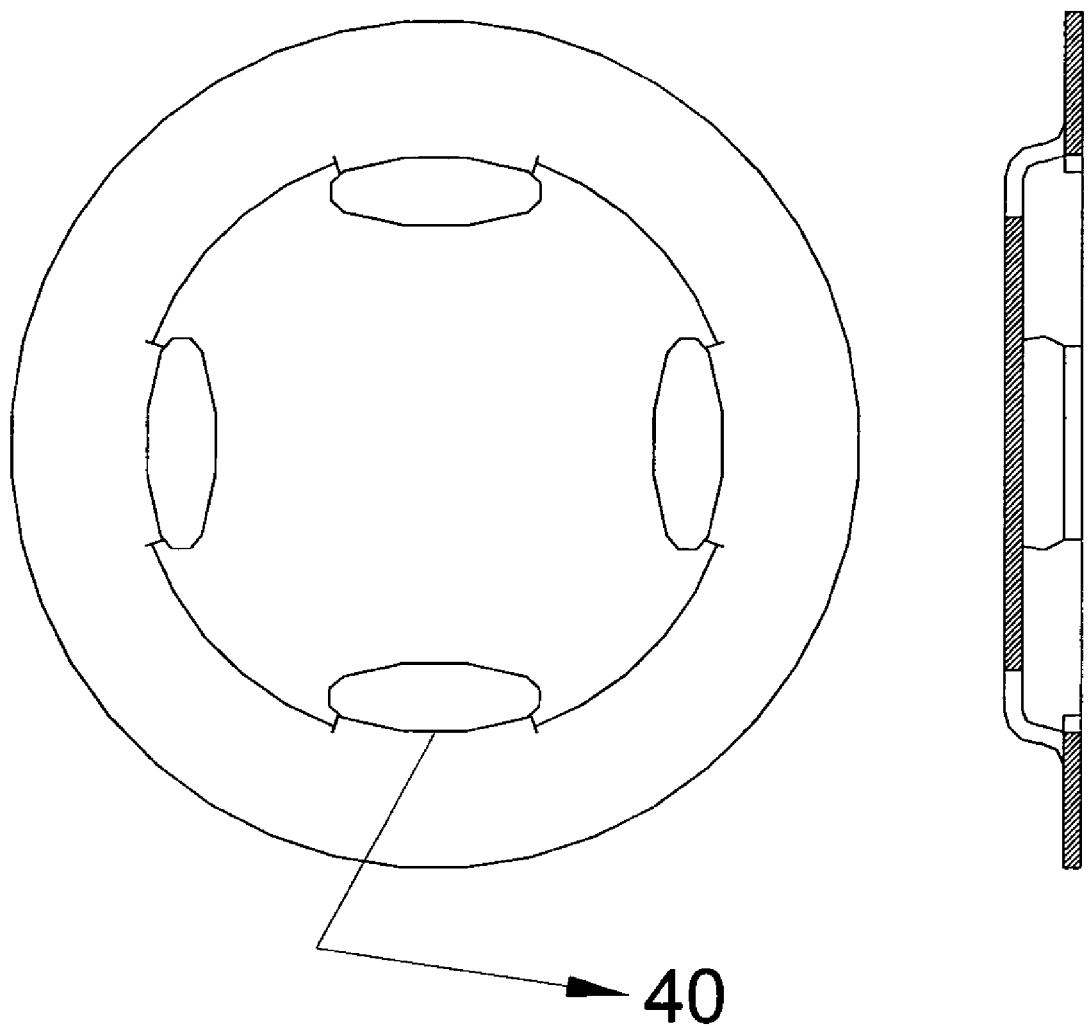
FIG. 6 depicts the cap of the improved header

Another advantage of the invention is the tear-tabs on the vent holes located on the cap as shown in FIG. 6. The tear-tabs 40 provide solid support ledges at which the rupture disc will tear when it is deformed by excessive gas pressure generated under abnormal conditions. Since the tabs are located right at the vent holes, a direct unimpeded path is provided for the gas to escape when the rupture disc is torn open.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-aqueous cylindrical rechargeable lithium battery comprising a lithium insertion compound cathode; a lithium compound anode; a non-aqueous electrolyte; and a pressure activated electrical disconnect device; said disconnect device activating at a predetermined internal pressure during overcharge abuse, wherein said disconnect device comprises a riveted contact between a rupture disc and an annular weld plate which disconnects when the internal pressure exceeds a predetermined value.

2. A non-aqueous rechargeable lithium battery as claimed in claim 1 wherein the battery additionally comprises other means of overcharge protection to protect the battery against overcharge abuse wherein the maximum operating voltage, current or temperature of the battery is exceeded.

3. A non-aqueous rechargeable lithium battery with a header comprising a cap with tear-tabs at the vent holes, a rupture disc, an insulating disc, a polypropylene gasket, and an annular weld plate that snap fits into said polypropylene gasket, wherein the annular weld plate is riveted to the rupture disc.

* * * * *